United States Patent [19]

Gentry et al.

[11] Patent Number: 4,634,936
[45] Date of Patent: Jan. 6, 1987

[54] INTRINSICALLY SAFE MINER'S LAMP

[75] Inventors: Kenneth R. Gentry, Bramalea; Michael Nikolich, Toronto, both of Canada

[73] Assignee: Levitt-Safety Limited, Toronto, Canada

[21] Appl. No.: 573,651

[22] Filed: Jan. 25, 1984

[51] Int. Cl.⁴ .................. G05F 1/00; H05B 37/02; H05B 39/04; H05B 41/14
[52] U.S. Cl. .................. 315/307; 323/276; 323/277; 323/293; 320/DIG. 1; 361/79; 361/93; 361/101; 362/105; 362/164; 362/183; 315/311
[58] Field of Search .................. 361/78, 79, 93, 98, 361/100, 101; 362/105, 106, 164, 183; 323/276, 277, 293, 298; 315/307, 310, 311; 320/DIG. 1

[56] References Cited

U.S. PATENT DOCUMENTS

| 3,818,273 | 6/1974 | Nakashima et al. | 317/22 |
| 4,150,302 | 4/1979 | Roche | 362/183 |
| 4,321,648 | 3/1982 | Kaplan | 361/101 |
| 4,360,851 | 11/1982 | Zundel | 361/101 |
| 4,415,945 | 11/1983 | Periot | 361/100 |
| 4,438,473 | 3/1984 | Cawley et al. | 361/101 |
| 4,513,343 | 4/1985 | Ryczek | 361/101 |

FOREIGN PATENT DOCUMENTS

| 3121754 | 9/1982 | Fed. Rep. of Germany. | |
| 3116846 | 12/1982 | Fed. Rep. of Germany | 361/101 |
| 2077525 | 12/1981 | United Kingdom | 362/183 |

OTHER PUBLICATIONS

Navy Technical Bulletin, vol. 4, No. 8, Aug. 1979.

Primary Examiner—Saxfield Chatmon
Attorney, Agent, or Firm—Willian Brinks Olds Hofer Gilson & Lione Ltd.

[57] ABSTRACT

An intrinsically safe battery pack arrangement for electrically powering electrical devices is disclosed. The power pack has a device for electronically determining a short in a cable or device and switching off the voltage to the power pack. The electronic device includes a transisterized circuit for sensing and controlling current through the cable. When the current exceeds a predetermined maximum, the circuit limits the current in the cable to a maximum value. The circuit is latched in the off position when the short is present for an extended time and the circuit may be reset after the short is removed and the problem corrected. This form of circuitry in power packs for use with mining equipment such as lamps, provides a unit which will not cause hazardous sparks when shorted thereby constituting an intrinsically safe device for use in mines.

15 Claims, 2 Drawing Figures

INTRINSICALLY SAFE MINER'S LAMP

FIELD OF THE INVENTION

This invention relates to battery packs for powering electrical devices and more particularly to electronic circuitry used in association with battery packs to prevent overcurrent conditions in the output of the battery pack causing dangerous sparks.

BACKGROUND OF THE INVENTION

Portable battery packs are commonly used to power various forms of electrical devices which may be used in explosive types of environments, as found in mines, chemical treatment plants and flour mills to name only a few. For example, portable battery packs are used to power lamps which are commonly affixed to the worker's helmet. Should the cable supplying power to the lamp be cut or abraded so as to short or cause an overcurrent condition, sparks can be generated which could set off an explosion in the environment.

An approach to preventing short circuits damaging circuitry for lamp power pack is disclosed in U.S. Pat. No. 4,317,162. A fusable link is used in the circuitry to prevent a short damaging the circuitry. However no consideration is given to reacting immediately to a short to limit current flow and prevent sparks which could set off an explosion.

The electronic circuitry, according to this invention for a battery pack, overcomes this problem to provide a system which is classified as intrinsically safe for use in mines and other similar explosive environments.

SUMMARY OF THE INVENTION

A battery pack for electrically powering an electrical device through an electrical cable, according to an aspect of this invention, has means for electronically determining an overcurrent condition in the cable or device and limiting current or switching off the voltage of the power pack. The electronic means comprises an electronic variable resistance device for controlling current through the cable. Means is provided for electronically sensing the current through the cable. The electronic variable resistance device reduces current in the cable to a predetermined maximum value in response to the sensing means sensing a current in excess of a predetermined maximum value. Means is provided for latching the electronic variable resistance device in the off condition after a predetermined time that the electronic variable resistance device has maintained current at or below the predetermined maximum value. Means is provided for resetting the latch means to permit the electronic variable resistance device to switch on and resume current through the cable.

According to another aspect of the invention, the electronic circuitry can be adapted to sense when the battery pack is being charged and turn off the lamp or the like which may be attached to the battery pack.

According to another aspect of the invention, the electronic circuitry can be adapted to provide a soft start up of a lamp bulb, when the battery pack is used with a lamp to prolong the lamp's useful life.

According to another aspect of the invention, the electronic circuitry can be adapted to prevent operation of the electrical device once the battery pack voltage has been reduced to a minimum level.

BRIEF DESCRIPT OF THE DRAWINGS

Preferred embodiments of the invention are shown in the drawings wherein.

DETAILED DESCRIPTION OF THE PREFERRED EMBODIMENTS

Figure 1:
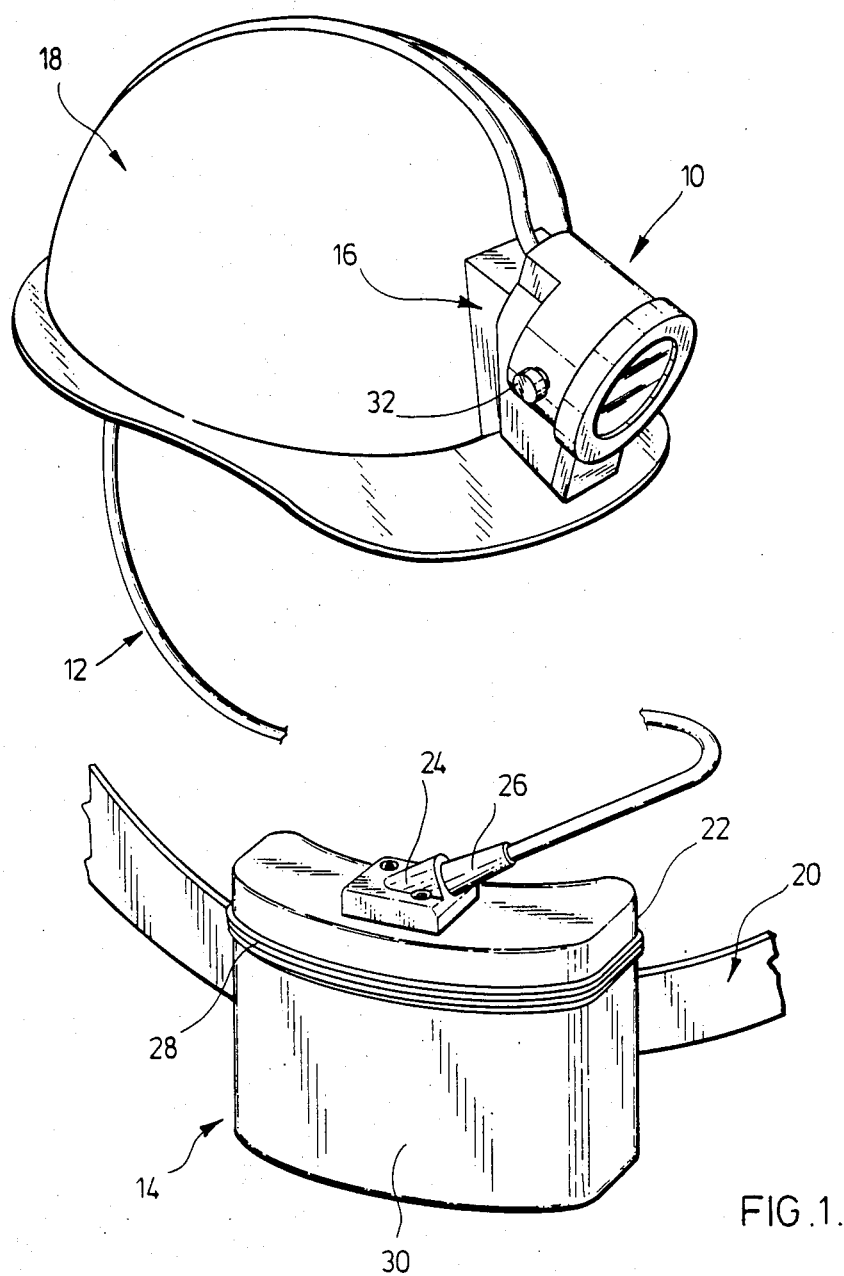
FIG. 1 is a perspective view of a battery pack according to this invention as used in powering a miner's lamp.

A miner's lamp 10 is shown in FIG. 1 which is powered by a portable battery pack 14 through the electrical cable 12. The miner's lamp 10 is mounted to the miner's helmet 18 by way of mounting device 16 in the standard manner. The portable battery pack 14 is conveniently carried about the miner's waist by means of a belt 20.

The battery pack 14 consists of a cap portion 22 which is sealingly engaged with the body portion 30 at the seam 28. The cable 12 enters through the cap 22 of the battery case via connection 24 which grips the cable and prevents the cable from being removed from the cap. A waterproof connector 26 surrounds the cable 12 to prevent entrance of any water to within the battery pack 14.

Provided on the lamp 10 is a manual switch 32 which is used to turn the lamp on and off and may optionally have cam arrangements to focus the lamp.

Although the arrangement shown in FIG. 1 has been described for use by miners, it is appreciated that the arrangement is useful in many other environments which require head lamps. For example, in tunnelling operations and maintenance operations of underground railways, large diameter pipe relining and maintenance and any other type of working environment which requires a portable light source which permits the user to have both hands free.

It is also appreciated that the power pack 14 can be used to power devices other than electrical lamps. For example, in maintenance work the portable power pack may be used to power maintenance equipment such as drills, saws and other hand implements used in various forms of underground maintenance, so that in general the power pack is adapted to power electrical devices which may or may not have a manual switch, such as switch 32 on the lamp 10 of FIG. 1.

Because the power pack is used in environments which can be explosive environments, such as in mines where explosive concentration of gases can develop or finely divided particulate matter as found in coal mines, it is important that the power pack be intrinsically safe, that is an overcurrent condition in the form of a short or failure in the unit will not cause sparks of a magnitude which can set off an explosion. Examples of an overcurrent condition in the device include a severing of the cable 12 causing at least a momentary excessive current flow or by abrasion, the wires of the cable become exposed which when they contact can cause a short.

Figure 2:
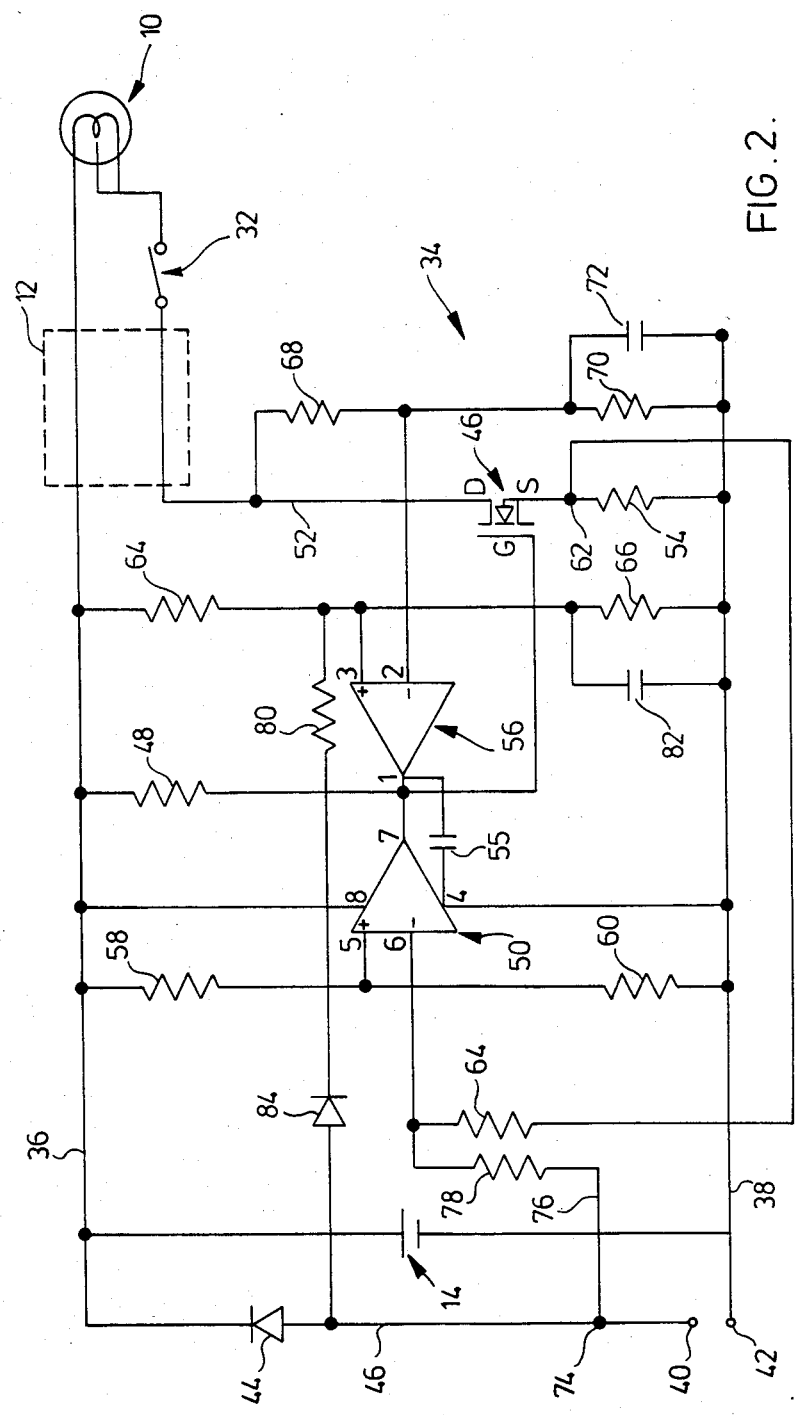
FIG. 2 is a circuit diagram of the electronic circuitry according to a preferred embodiment of the invention for preventing sparks which could set off an explosion in the environment.

According to the circuitry of this invention as shown in FIG. 2, an intrinsically safe power pack is provided. The circuitry generally designated 34 controls the current through the lamp 10 via the cable 12. The manual switch 32 is provided externally of the circuitry 34. The battery pack 14 is connected across lines 36 and 38 where line 36 is positive and line 38 is negative. The battery pack 14 may consist of a series of batteries of the nickel-cadmium type which are rechargeable and have high power output for their relative size. To facilitate recharging of the battery pack 14, terminals 40 and 42 are exterior of the base portion 30 of the battery pack and are on the inside thereof so they are not visible in FIG. 1. Terminal 40 becomes positive and terminal 42 is negative when connected to a charging device. To prevent discharging of the power pack 14 through exposed terminals 40 and 42, a diode 44 is inserted in line 46 connecting the positive charging terminal 40 to the positive side of power pack 14.

The electronic circuit 34 is adapted to determine an overcurrent condition in the cable 12 or the electrical device such as lamp 10 and switch off the voltage of the power pack to the electrical device. An electronic variable resistance device 46 in the form of a field effect transistor (FET) is connected in series with manual switch 32 with its drain side on the switch 32 and its source side on the negative terminal of the power pack 14 and the gate is at the potential determined by resistor 48 on line 36. The parameters of the circuit are chosen such that the gate of the FET 46 is at sufficiently high potential to turn fully on the FET 46 to complete the circuit to the lamp 10 when the manual switch 32 is closed. In this state, the variable resistance device has minimal resistance. A voltage comparator 50 is used to determine when there is an overcurrent condition in the cable 12 or lamp 10 by sensing a sudden increase in current in line 52 due to a voltage drop across resistor 54. A second comparator 56 is used to latch the FET 46 in the off state when the short in the cable or lamp lasts for longer than a predetermined time period.

Comparators 50 and 56 may be in the form of an integrated circuit having the pin markings 1 through 8. For comparator 50, the voltage set for the comparator is determined at pin 5 by resistors 58 and 60 as they are connected across lines 36 and 38. During normal operation, there is minimal voltage drop across resistor 54 due to low current flow as drawn by the lamp 10. Thus the potential on pin 6, as determined at point 62 in combination with resistor 64, is below the potential of pin 5. In this state, the comparator 50 has a positive output at pin 7 so that it has no effect on the gate of the FET 46.

Also during normal operation, the potential on pin 3 of comparator 56 is determined by resistors 64 and 66 as connected across lines 36 and 38, which is above the potential on pin 2 as determined by resistors 68 and 70. Thus the output at pin 1 is also positive and maintains the potential determined by resistor 48 on the gate of the FET 46 to keep it fully on.

When a short occurs, the current in line 52 rapidly increases resulting in a significant voltage drop across resistor 54 which, by selecting the appropriate parameters in resistors 54 and 64, the pin voltage 6 rises above the pin voltage at 5. This causes an inversion in comparator 50 so that pin 7 output goes towards ground which lowers the voltage on the gate of FET 46. In this state, the variable resistance device 46 increases its resistance value to a level which limits the current flow through line 52 to a level at which the short cannot cause a spark which is capable of setting off an explosion. The parameters of the comparator and resistors is selected to react quickly to the occurrence of the overcurrent condition, preferably within one to five milliseconds of the short occurring. If the short is only momentary and is removed, the circuitry goes back to normal where current in line 52 reduces, resulting in the comparator 50 inverting to provide a positive output at pin 7.

Should the short remain, the circuitry stabilizes so that voltage on pin 6 remains essentially unchanged and voltage on the gate of FET 46 also remains unchanged to thereby limit current to the predetermined maximum. During this limiting of the current through line 52, the current never exceeds approximately one amp such that any continuous short will not cause sparks which could set off an explosion.

The circuit remains in this stabilized state for a predetermined time period which is determined by the latching device 56. As the current is limited by the FET 46, the capacitor 72 commences charging by way of the current through resistor 68. As the capacitor 72 charges, it elevates the potential on pin 2 eventually to a level (depending upon the time constant of resistor 68, capacitor 72) above the potential on pin 3. The comparator 56 then inverts to drop the output of pin 1 towards ground which removes the potential from gate of FET 46 to latch the FET 46 completely off. In this state, the variable resistance device 46 has essentially an infinite resistance to current in line 52. The comparator 56 does not invert again until the capacitor 72 can discharge. The capacitor 72 will not discharge as long as the short remains and the switch 32 is closed. When the switch 32 is open, the capacitor 72 discharges through resistor 70 and depending upon its time constant, determines when the potential on pin 2 falls below the potential of pin 3 to invert comparator 56 and allow its output at pin 1 to go positive applying the necessary voltage on the gate of FET 46 to fully open the FET 46. Depending upon the parameters of the comparators 50 and 56, there may be a tendency for the comparators to oscillate. This is eliminated by placement of a capacitor 55 across pins 1 and 4 of the two comparators.

It is appreciated that in the event the short is caused by a severing of cable 12, the capacitor 72 would not normally have sufficient time to charge to a level which could cause a latching off of the FET 46. However should it do so, as soon as the short is removed that is the device which caused the severing of the cord 12, the capacitor 72 would discharge and cause a reopening of the FET 46. Any other metal implements which could cause shortage of the exposed wire would result in current limiting as controlled by comparator 50.

According to this invention, the comparator 50 can also be used to determine when a charging potential is applied between charging electrodes 40 and 42 in recharging the battery 14. According to a preferred embodiment, there is no need to open the manual switch 32 during the charging process because the comparator 50 is adapted to turn off completely the FET 46 and thereby turn off the light 10 during the charging cycle. This is advantageous to indicate to the individual responsible for charging the battery that when he sees the unit in the charging unit with the lamp off, he knows that the unit is charging. The pin 6 is thereby connected to the line 46 at 74 through line 76 and resistor 78. When the battery pack is placed in the charging circuit and a positive potential applied to electrode 40, the potential on pin 6 rises above the potential on pin 5 to cause an inversion of comparator 50 and provide an output at point 7 which reduces the voltage on the gate on FET 46 to a level which turns the FET off. At the same time, pin 3 voltage is altered via resistor 80 and capacitor 82. The charging potential applied across electrodes 40 and 42 is normally above that of battery pack 14. The potential on pin 3 is elevated above its normal level where capacitor 82 charges in conjunction with resistor 64 to hold the potential on pin 3 above the potential on pin 2 as created by the charging of capacitor 72. The comparator 56 does not latch the FET off so that when the battery pack is taken away from the recharging circuit the lamp 10 turns back on. Diode 84 is provided in series with resistor 80 to prevent the potential on pin 3 having any effect on the potential of pin 6 during the normal operation of the power pack.

Immediately after the battery pack is removed from the charger, the potential on pin 3 would normally drop below that of pin 2 because the circuit is now powered by the battery pack 14. The time constant of capacitor 82 with resistor 66 is chosen to be longer than the time constant of capacitor 72 with resistor 70, so that potential on pin 3 remains above that on pin 2 to prevent inversion of comparator 56.

An additional aspect of the circuitry 34 is in providing a soft start for the lamp 10 to prolong the life of the bulb. When the manual switch 32 is closed, the filament of the bulb 10 is cold and thus has a lower resistance. The current in line 52 can go into an overcurrent condition which through comparator 50 and resistor 54 limits the current in line 52 by moving the FET 46 towards its off state. However due to the FET 46 limiting the current, the filament of lamp 10 is gradually warmed up to operating temperatures when the filament is sufficiently hot that the circuitry 34 operates in a normal manner, the FET 46 is fully on. The time frame within which the lamp filament is heated will always be less than the time for comparator 56 to latch the FET off.

A further feature of the circuitry 34 is that it turns the FET 46 fully off when the voltage of the power pack 14 falls below a predetermined level. It is appreciated that with rechargeable batteries of the dry and wet cell type, if they are reduced to a very low potential, considerable damage can result and the batteries may never regain a full charge when recharged. As the voltage of the power pack 14 drops during usage, the reference voltage on pin 5 begins to decrease where the voltage on pin 6 can exceed that on pin 5 which results in current limiting by FET 46. As the voltage continues to fall, the comparator 56 latches the FET 46 off. This will allow the batteries 14 to regenerate themselves to a limited extent. To reset the latch 46, the switch 32 must be opened to allow discharge of capacitor 72. Should the switch 72 be reclosed, a brief period of illumination by the lamp can be drawn from the battery 14 before the voltage falls below the predetermined voltage. This provides a safety feature in the arrangement to alert the user that the potential is falling below a predetermined minimum. Should the user be working in a dark area, he can obtain sufficient bursts of light from the lamp by opening and closing switch 32 over periods of time to assist him in finding his way back to safety.

An example of the circuit of FIG. 2 is as follows which demonstrates a preferred embodiment of the invention and is not intended to be limiting to the scope of the appended claims. The parameters of the circuitry components are chosen so that the circuitry 34 will sense and react to an overcurrent condition of current in excess of a predetermined one amp within approximately one to five milliseconds and limit the current through the cable to one amp or less. The circuit will latch the electronic switch completely off within one hundred to two hundred milliseconds. To achieve soft start of the lamp, the bulb value should be selected such that it is up to normal running resistance within seventy milliseconds, that is less than the predetermined time to latch the electronic variable resistance device off. The parameters of the circuit are also chosen to latch the FET off when the voltage on the battery pack, which initially may be six volts, is reduced to less than three volts. To achieve these desired features for the operation of the power pack, the battery pack consists of serially connected nickel-cadmium batteries to provide an overall voltage of six volts. The FET 46 is commonly referred to as a power field effect transistor which may be obtained from International Rectifier under the trade mark HEXFET. The comparators 50 and 56 are of the normal variety which are readily obtainable and may be provided in the form of an IC chip. Capacitors 72 and 82 are each ten microfarads. Capacitor 55 is 0.47 microfarads. Capacitors 55, 72, 82 are all dipped tantalums with no less than 10 VDC working voltage rating. Resistor 58 is 56K-ohms, resistor 48 is 100K-ohms and resistor 64 is 470K-ohms. Resistors 68 and 70 are both 68K-ohms, whereas resistors 64 and 66 are respectively 460K-ohms and 180K-ohms. Resistor 60 is 1K-ohms, resistor 64 is 10K-onms and resistor 78 is 470K-ohms. Resistor 54 has a resistance of 0.1 ohm. Resistor 80 is 470K-ohms. Diode 84 is of the conventional type IN914 or equivalent to handle the necessary current flowing therethrough. With a circuitry of these parameters, the above criteria are provided.

Although various preferred embodiments of the invention have been described herein in detail, it will be understood by those skilled in the art that variations may be made thereto without departing from the spirit of the invention or the scope of the appended claims.

The embodiments of the invention in which an exclusive property or privilege is claimed are defined as follows:

1. A battery pack for electrically powering an electrical device through an electrical cable, said battery pack having means for electronically determining an overcurrent condition in said cable or device and limiting current flow or switching off the voltage of said power pack, said electronic means comprising an electronic variable resistance device for controlling current through said cable, means for electronically sensing the current through said cable and said electronic variable resistance device limiting current through said cable to a predetermined maximum value in substantially instantaneous response to said sensing means sensing a current in excess of or equal to said predetermined maximum value, means for latching said electronic variable resistance device in the off condition after a predetermined time that said electronic variable resistance device has maintained current at or below said predetermined maximum value, means for resetting said latch means to permit said electronic variable resistance device to switch on and resume current through said cable.

2. A battery pack of claim 1 having rechargeable batteries, wherein said pack has two terminals connected to positive and negative electrodes of the battery pack for recharging said battery pack, said sensing means being adapted to sense the presence of charging voltage between said charging terminals and said electronic variable resistance device switching off in response to said sensing means sensing a charging voltage across said charging terminals.

3. A battery pack of claim 2, wherein a manual on/off switch in series with said electronic variable resistance device is provided for manual control of current in said cable, said manual switch remaining in the on position during charging of said battery pack.

4. A battery pack of claim 1, wherein said sensing means after initially sensing a current exceeding said predetermined maximum value, said electrons variable resistance device continuing to limit current about said predetermined maximum.

5. A battery pack of claim 4 used to power a miner's lamp having a bulb with a filament, said filament when cold having a low resistance value such that initial current through said cold filament exceeds said predetermined maximum, said electronic sensing means thereby causing said electronic variable resistance device to limit current through said filament to said predetermined maximum to warm said filament to operating temperature at which said filament has sufficient resistance value to reduce the current flow through said cable to below said predetermined maximum, the time during which said filament is heating up to operating temperature being less than said predetermined time for said latch means to latch said electronic variable resistance device in the off condition.

6. A battery pack of claim 1 or 4, wherein said electronic sensing means in order to function properly requires a minimum voltage level in said battery pack, when said battery pack voltage falls below said minimum voltage level, said electronic variable resistance device automatically switches to the off condition.

7. A battery pack of claim 1 or 4, wherein said electronic sensing means in order to function properly requires a minimum voltage level in said battery pack, when said battery pack voltage falls below said minimum voltage level, said electronic variable resistance device automatically switches to the off condition, wherein said latch means latches said electronic variable resistance device off.

8. A battery pack of claim 1, wherein said sensing means comprises a voltage comparator for comparing voltage drop across a resistor in series with said electronic variable resistance device with a voltage set on said comparator by said battery pack, the occurrence of an overcurrent condition in said cable or device causing a sudden increase in voltage drop across said resistor which exceeds the set voltage in said comparator thereby causing said comparator to change states to indicate an overcurrent condition, said comparator being adapted to indicate such overcurrent condition within 1 to 5 milliseconds.

9. A battery pack of claim 8, wherein said electronic variable resistance device comprises a field effect transistor with said comparator having its output connected to the gate of said transistor, said comparator output dropping the voltage on said transistor gate when an overcurrent condition occurs to limit thereby the current flowing through said cable.

10. A battery pack of claim 9, wherein said transistor is adapted to limit current to 1 amp or less during said predetermined time.

11. A battery pack of claim 8, wherein said latching means comprises a second voltage comparator with its output connected to the output of said first voltage comparator, said second voltage comparator having a voltage set on said comparator by said battery pack, electronic means for elevating and maintaining voltage on said second comparator which is to be compared to said set voltage during said predetermined time such that at the expiry of said predetermined time said voltage to be compared is elevated above the set voltage to cause said second comparator to change states to indicate the continued existance of an overcurrent condition and latch said electronic variable reistance device in the off condition, said predetermined time being in the range of 100 to 200 milliseconds.

12. A battery pack of claim 11, wherein said electronic variable resistance device comprises a field effect transistor with said outputs of the first and second comparator connected to the gate of said transistor, said second comparator output dropping the voltage on said transistor gate and maintaining the gate voltage sufficiently low to switch off said transistor.

13. A battery pack of claim 12, wherein said reset means comprises a manual switch on said cable which when the overcurrent condition is corrected, the manual switch is opened to remove the battery voltage from said means for elevating the voltage on said comparator and permits said voltage elevation means to lower the voltage below the set voltage on said second comparator causing said second comparator to change states and thereby raising the voltage on said transistor gate to switch the transistor on.

14. A battery pack of claim 11, having rechargeable batteries wherein said pack has two terminals connected to positive and negative electrodes of the battery pack for recharging said battery pack, said first comparator being adapted to sense changing voltage across the changing terminals which is in excess of the set voltage on the first comparator, when said battery is being charged said first comparator changes states for the duration of charging said batteries to switch off thereby said electronic variable resistance device, second means for elevating the voltage set on said second comparator during the charging of said batteries, said second means elevating the set voltage above the maximum to which said first voltage elevation means can elevate the voltage to be compared thereby precluding said second comparator from latching said electronic variable resistance device off.

15. A battery pack of claim 14, wherein each of said first and second elevation means includes a capacitor, the time constant of said second capacitor on discharge being greater than the time constant on discharge of the first capacitor to prevent said second comparator latching said electronic variable resistance device off immediately after the battery pack is disconnected from the charging circuit.

* * * * *

UNITED STATES PATENT AND TRADEMARK OFFICE
CERTIFICATE OF CORRECTION

PATENT NO. : 4,634,936
DATED : Jan. 6, 1987
INVENTOR(S) : Kenneth R. Gentry et al.

It is certified that error appears in the above-identified patent and that said Letters Patent is hereby corrected as shown below:

IN THE SECTION ENTITLED
"BRIEF DESCRIPT OF THE DRAWINGS"

In the above heading (column 2, line 1) please delete "DESCRIPT" and substitute therefor --DESCRIPTION--;

In column 2, line 6, please delete "lamp;" and substitute therefor --lamp.--.

IN THE DETAILED DESCRIPTION
OF THE PREFERRED EMBODIMENTS

In column 6, line 21, please delete "10K-onms" and substitute therefor --10K-ohms--.

IN THE CLAIMS

In Claim 4 (column 7, line 3), please delete "electrons" and substitute therefor --electronic--;

UNITED STATES PATENT AND TRADEMARK OFFICE
CERTIFICATE OF CORRECTION

PATENT NO. : 4,634,936

DATED : Jan. 6, 1987

INVENTOR(S) : Kenneth R. Gentry et al.

It is certified that error appears in the above-identified patent and that said Letters Patent is hereby corrected as shown below:

In Claim 11 (column 8, line 13), please delete "reistance" and substitute therefor --resistance--.

Signed and Sealed this

Nineteenth Day of July, 1988

Attest:

DONALD J. QUIGG

Attesting Officer

Commissioner of Patents and Trademarks